March 10, 1970  D. E. QUERNHEIM  3,499,206
ATTACHMENT FOR BAR CLAMP
Filed July 17, 1967

United States Patent Office 3,499,206
Patented Mar. 10, 1970

3,499,206
ATTACHMENT FOR BAR CLAMP
David E. Quernheim, 311 Lincoln Ave.,
Waterloo, Ill. 62298
Filed July 17, 1967, Ser. No. 653,912
Int. Cl. B23p 19/04; B25b 1/24
U.S. Cl. 29—239
1 Claim

ABSTRACT OF THE DISCLOSURE

An attachment is releasably securable to the force-applying, movable member of a bar clamp to enable that bar clamp to apply tensile forces to an object.

---

Figure 1:
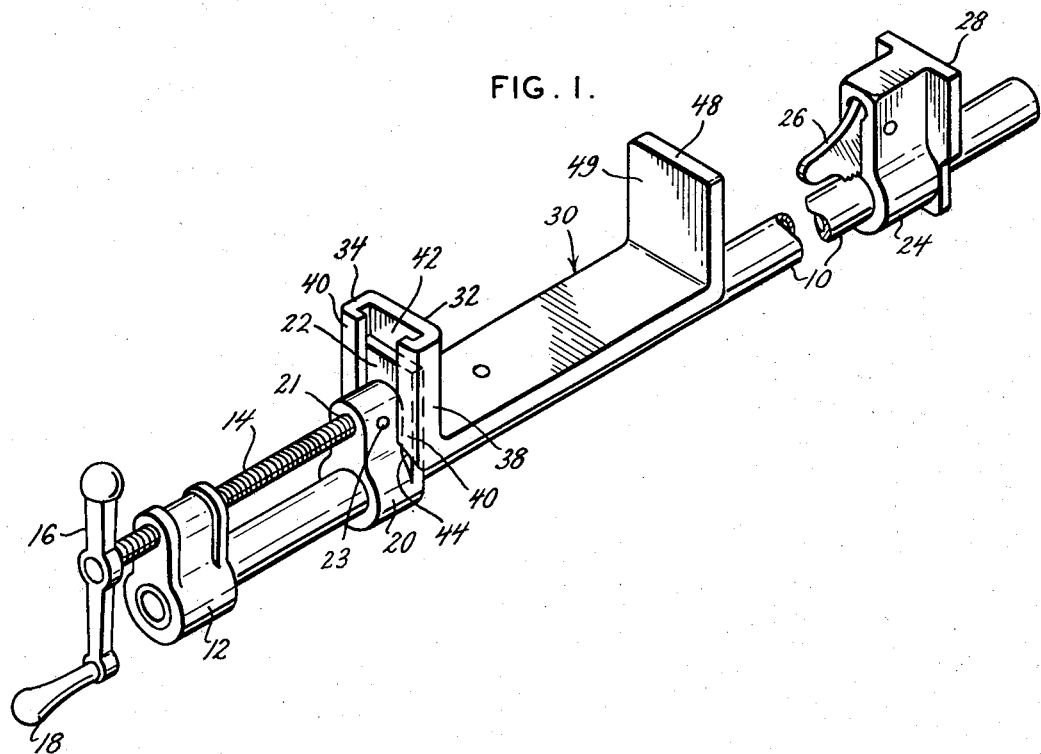

This invention relates to improvements in attachments for bar clamps. More particularly, this invention relates to improvements in attachments which can be releasably secured to bar clamps to enable those bar clamps to apply tensile forces to objects.

It is, therefore, an object of the present invention to provide an improved attachment for a bar clamp which can be releasably secured to that bar clamp to enable that bar clamp to apply tensile forces to an object.

The attachment provided by the present invention is releasably securable to the force-applying, movable member of a bar clamp; and that attachment is formed so it can engage an object and can apply a tensile force to that object. To use that attachment with a bar clamp, the position of the normally-stationary, force-applying member of that bar clamp is reversed so the force-applying face of that force-applying member is directed away from the force-applying, movable member of that bar clamp; and then that attachment is secured to that force-applying movable member. The force-applying face of the normally-stationary, force-applying member will then be set adjacent one surface of an object to which tensile forces are to be applied; and then one surface of the attachment will be set adjacent another surface of that object. Thereafter, the force-developing screw of the bar clamp will be rotated to pull the force-applying, movable member of the bar clamp away from the normally-stationary, force-applying member of that bar clamp; and the resulting relative movement of those force-applying members will pull the attachment away from the normally-stationary, force-applying member. As that attachment moves away from that normally-stationary, force-applying member, it will coact with that normally-stationary, force-applying member to apply the desired tensile forces to the object which is engaged by the normally-stationary, force-applying member and the attachment. It is, therefore, an object of the present invention to provide an attachment for a bar clamp which can be releasably secured to the force-applying, movable member of that bar clamp and which has a surface that can be set in engagement with a surface of an object to which tensile forces are to be applied.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
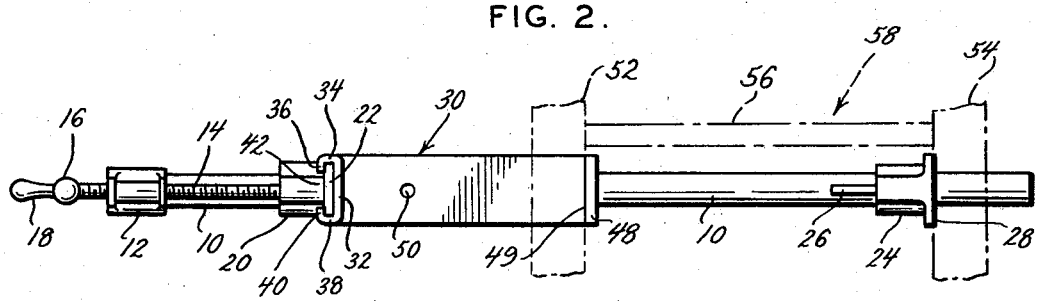
Figure 3:
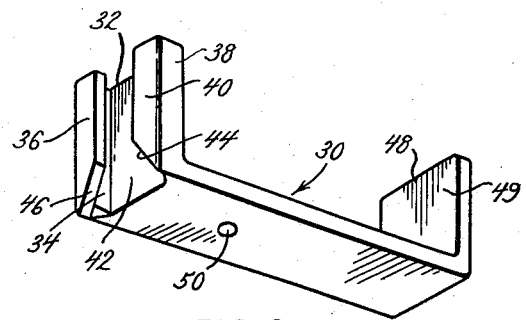

In the drawing, FIG. 1 is a broken, perspective view of one bar clamp with which the attachment provided by the present invention is assembled;

FIG. 2 is a plan view, on a smaller scale, of the bar clamp and attachment shown in FIG. 1, as that attachment and bar clamp apply tensile forces to an object which is indicated by dotted lines, and FIG. 3 is a perspective view of the attachment shown in FIGS. 1 and 2.

Referring to the drawing in detail, the numeral 10 denotes the bar or pipe of a standard and usual bar clamp; and a pivot block 12 is rigidly mounted on one end of that bar. That pivot block has a threaded opening therein; and the threads in that opening accommodate the thread on an elongated force-applying screw 14 which has a crank 16 fixedly secured to the outer end thereof. That crank is provided with a handle 18, which can be gripped by the hand or fingers of the user of the bar clamp, and which can be used to rotate the crank 16—and thus the force-applying screw 14. The numeral 20 denotes a slide which has a lower opening therein; and that opening telescopes over the bar 10, and it is made large enough to permit ready reciprocation of that slide relative to that bar. The slide 20 also has an upper opening 21 therein; and that opening accommodates the forward end of the force-applying screw 14. A fastener 23, such as a pin, rivet or set screw, extends through a further opening in the upper portion of the slide 20; and the inner end of that fastener extends into an annular groove in the forward end of the force-applying screw 14—to prevent separation of that screw from that slide while permitting rotation of that screw relative to that slide. A force-applying flange 22 is provided at that face of the slide 20 which is opposite to the force-applying screw 14. The slide 20 constitutes the movable, force-applying member of the bar clamp shown in FIGS. 1 and 2; and the exposed face of the flange 22 on that slide constitutes the normal, force-applying face of that movable, force-applying member.

The numeral 24 denotes the normally-stationary, force-applying member of the bar clamp shown in FIGS. 1 and 2. That normally-stationary, force-applying member has a positioning element 26 rotatably secured thereto; and that positioning element will normally coact with the exterior of the bar 10 to prevent movement of that normally-stationary, force-applying member in response to forces that are applied to the force-applying face 28 of that normally-stationary, force-applying member. The bar 10, the rigidly-mounted pivot block 12, the force-applying screw 14, the crank 16, the handle 18, the slide 20, the opening 21 in that slide, the fastener 23 for that slide, the pressure-applying flange 22 on that slide, the normally-stationary, holding member 24, the positioning element 26, and the force-applying face 28 of that normally-stationary, force-applying member are of standard and usual construction; and they are not, per se, parts of the present invention. The normally-stationary force-applying member 24 has, in FIGS. 1 and 2, been rotated one hundred and eighty degrees from the position which it normally occupies on the bar 10. Specifically, the force-applying face 28 of that normally-stationary, force-applying member normally confronts the flange 22 on the slide 20; but, in FIGS. 1 and 2, the force-applying face 28 is directed away from that flange.

The numeral 30 generally denotes the attachment which is provided by the present invention, and which can be used with a bar clamp to apply tensile forces to an object. That attachment has an upstanding end 32 which is provided with an axially-directed flange 34 and with a second axially-directed flange 38. The flange 34 has a lip 36 thereon; and that lip extends laterally toward and confronts a lip 40 on the flange 38. The confronting faces of the lips 36 and 40 are spaced apart, and those confronting faces coact with the flanges 34 and 38 to define a slot 42 which is T-shaped in plan view, as shown particularly by FIG. 2. The lower end of the lip 36 is inclined, as shown by the numeral 46; and the lower end of the lip 40 also is inclined, as indicated by the numeral 44. The T-shaped slot 42, which is defined by the flanges 34 and 38 and by the lips 36 and 40, is dimensioned to accommodate the force-applying flange 22 on the slide 20. The inclined lower faces 44 and 46, respectively, of the lips 40 and 46 on the attachment 30 facilitate the telescoping of the T-shaped slot 42 downwardly over the force-applying flange 22 on the slide 20. Those inclined lower faces also accommodate the rounded portions of the slide 20 which are intermediate the upper and lower portions of that slide.

The numeral 48 denotes a second upstanding end for the attachment 30; and that upstanding end coacts with the upstanding end 32 to provide a generally U-shaped configuration for that attachment. The inner face 49 of the upstanding end 48 constitutes the force-applying face of that upstanding end; and that face is directed toward the force-applying flange 22 on the slide 20. An opening 50 is formed in the body portion of the attachment 20; and that opening can be telescoped over a nail, a hook or the like to support that attachment when that attachment is not secured to a bar clamp.

The numeral 52 denotes an upright of an object 58 to which tensile forces are to be applied; and the numeral 54 denotes a further upright of that object. The numeral 56 denotes a tie bar, dowel, rung, or the like which normally inter-connects the uprights 52 and 54 of the object 58. One example of an object to which tensile forces need to be applied is a chair 58 wherein the glue, which normally holds the rung 56 solidly within recesses in the legs 52 and 54, has loosened but has not freed that rung. To free that rung from one or the other of the legs 52 and 54, the user of the bar clamp will dispose the normally-stationary, force-applying member 24 so the force-applying face 28 of that member faces away from the force-applying flange 22 on the slide 20; and he will then telescope the T-shaped slot 42 in the upstanding end 32 of the attachment 30 over that force-applying flange. Thereafter, the handle 18 will be used to rotate the crank 16 far enough to cause the force-applying screw 14 to dispose the slide 20 an appreciable distance away from the pivot block 12; and then the force-applying face 49 of the upstanding end 48 of the attachment 30 will be set in engagement with the inner face of the leg 52, while the force-applying face 28 of the normally-stationary, force-applying member 24 will be disposed adjacent the inner face of the leg 54. If necessary, the positioning element 26 can be shifted relative to the normally-stationary, force-applying member 24 to permit telscoping of that member along the bar 10 into close proximity to the inner face of the leg 54. Thereafter, appropriate rotation of the crank 16 will cause the force-applying screw 14 to move the slide 20 to the left in FIGS. 1 and 2, and thus will cause the attachment 30 to move to the left. Such movement will cause the force-applying face 49 of the upstanding end 48 to move into force-applying engagement with the inner surface of the leg 52; and the rung 56 will act to pull the leg 54 of the chair 58 into intimate engagement with the force-applying face 28 of the normally-stationary, force-applying member 24. Continued rotation of the crank 16 will enable the attachment 30 and the bar clamp to ease the leg 52 away from the leg 54, and thus will cause the recess in the leg 52 to free the rung 56 or will pull the other end of that rung away from the recess in the leg 54. In either event, the force which is applied by the bar clamp and attachment 30 will be a controlled force; and that force can be applied as rapidly or as slowly as desired. Consequently, the rung 56 can be freed from one or the other of the legs 52 and 54 of the chair 58 with a minimum of manual effort, and with a maximum likelihood that the rung 56 and the legs 52 and 54 will not be damaged.

After a fresh supply of glue has been applied to the freed end of the rung 56, that freed end can be telescoped back into the recess in the leg from which it was removed. The normally-stationary, force-applying member 24 can then be telescoped off of the bar 10, can be rotated one hundred and eighty degrees about an axis normal to the axis of that bar, and then can be telescoped onto that bar so the force-applying face 28 thereof will confront the force-applying flange 22 on the slide 20. If desired, the attachment 30 can be separated from the slide 20 so the force applied to the outer surfaces of the legs 52 and 54 of the chair 58 will be applied by the force-applying face 28 of the normally-stationary, force-applying member 24 and the force-applying flange 22 of the slide 20. In those instances where the compressive forces to be applied by the bar clamp will be quite small, the attachment 30 can be left in engagement with the force-applying flange 22 on the slide 20; and the outer face of the upstanding end 48 of that attachment will then be used as a force-applying face.

The attachment 30 is shown as being a casting; and that attachment will preferably be formed by a casting operation. However, if desired, that attachment could be formed by selecting an elongated plate, by welding a short plate to that elongated plate to form the upstanding end 48, by welding a second short plate to that elongated plate to form the upstanding end 32, and by welding angle-shaped sections to the second short plate to define the flanges 34 and 38 and the lips 36 and 40 thereon. Also, if desired, the attachment 30 could be formed by bolting or otherwise securing the various components thereof together.

The upper surface of the bar 10 will preferably underlie and engage the lower surface of the central body portion of the attachment 30 whenever that attachment is assembled with the bar clamp. Where that is the case, the engagement between the upper surface of that bar and the lower surface of that central body portion will minimize the bending moments which will be applied to the upstanding end 32 and to the flanges 34 and 38 and the lips 36 and 40 thereon when that attachment is helping apply tensile forces to an object.

Whereas the drawing and accompanying description have shown and described a preferred embodiment of the present invention it should be apparent to those skilled in the art that various changes may be made in the form of the invention without affecting the scope thereof.

What I claim is:

1. An attachment, for a bar-type clamp which has a normally-stationary jaw and a movable jaw, that comprises a central body portion and end portions that are spaced apart by said central body portion, one of said end portions of said attachment having a surface thereon that is complementary to and that interacts with a surface on said movable jaw to releasably secure said attachment to said movable jaw, a flange at one edge of said one end portion and a second flange at the opposite edge of said one end portion that help define said interacting surface on said one end portion of said attachment, said flanges partially surrounding and extending behind part of said movable jaw and resisting separation of said attachment from said movable jaw along a direction parallel to the bar of said bar-type clamp, said flanges permitting ready separation of said attachment from said movable jaw when said one end of said attachment is moved relative to said movable jaw in a direction transverse of said bar of said bar-type clamp, the other of said end portions of said attachment being directed transversely of said central body portion and projecting outwardly beyond said central body portion to be disposable in engagement with a surface of an object to which tensile forces are to be applied, said attachment being readily separable from said movable jaw to enable said bar-type clamp to apply compressive forces to a different object, said flanges extending away from said normally-stationary jaw, said flanges having the lower ends thereof relieved to facilitate telescoping of said interacting surface on said one end portion over said interacting surface on said one end portion of said movable jaw.

References Cited

UNITED STATES PATENTS

| 612,415 | 10/1898 | Hanson | 269—283 X |
| 1,365,559 | 1/1921 | Starks | 29—239 X |
| 1,781,997 | 11/1930 | Berezowski | 269—249 X |
| 2,865,585 | 12/1958 | Beyer | 29—256 |

ROBERT C. RIORDON, Primary Examiner

J. C. PETERS, Assistant Examiner

U.S. Cl. X.R.

269—283